US009939647B2

(12) United States Patent
Vallius et al.

(10) Patent No.: US 9,939,647 B2
(45) Date of Patent: Apr. 10, 2018

(54) EXTENDED FIELD OF VIEW IN NEAR-EYE DISPLAY USING OPTICALLY STITCHED IMAGING

(71) Applicant: Microsoft Technology Licensing, LLC, Redmond, WA (US)

(72) Inventors: Tuomas Vallius, Espoo (FI); Pasi Petteri Pietilae, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/186,763

(22) Filed: Jun. 20, 2016

(65) Prior Publication Data
US 2017/0363871 A1 Dec. 21, 2017

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/1842* (2013.01); *G02B 6/0016* (2013.01);
(Continued)

(58) Field of Classification Search
CPC .. G02B 7/0172; G02B 7/0081; G02B 7/4205; G02B 7/4261; G02B 5/1814;
(Continued)

(56) References Cited

U.S. PATENT DOCUMENTS 5,418,584 A 5/1995 Larson
5,502,486 A * 3/1996 Ueda ................ H04N 5/272
348/239
(Continued)

FOREIGN PATENT DOCUMENTS

WO 2015091277 A1 6/2015

OTHER PUBLICATIONS

Rolland, et al., "Head-Mounted Display Systems", In Proceedings of Encyclopedia of optical engineering, Jan. 2005, pp. 1-14. (14 pages total).
(Continued)

*Primary Examiner* — Tom Sheng
(74) *Attorney, Agent, or Firm* — Mark K. Young; Mayer & Williams PC

(57) ABSTRACT

An extended field of view (FOV) is provided by an exit pupil expander in a near-eye display system that uses a waveguide with multiple diffractive optical elements (DOEs) for in-coupling light, expanding the pupil in two directions, and out-coupling light to a system user's eye. Left and right in-coupling DOEs in-couple pupils respectively produced by a pair of imagers—one imager provides a left portion of the FOV and the other imager provides the right portion. The left portion and right portion of the FOV respectively propagate in a left and right intermediate DOEs which expand the pupil in a first direction and diffract light to an out-coupling DOE. The out-coupling DOE expands the pupil in a second direction, stitches the extended FOV together by combining the left and right portions of the FOV produced by the imagers, and out-couples the extended FOV to the user's eye.

20 Claims, 21 Drawing Sheets

(51) Int. Cl.
*G02B 27/00* (2006.01)
*G02B 5/18* (2006.01)
*G02B 27/42* (2006.01)

(52) U.S. Cl.
CPC ....... *G02B 6/0035* (2013.01); *G02B 27/0081* (2013.01); *G02B 27/4205* (2013.01); *G02B 27/4261* (2013.01); *G02B 2027/0125* (2013.01); *G02B 2027/0132* (2013.01)

(58) Field of Classification Search
CPC .. G02B 5/1819; G02B 5/1823; G02B 5/1842; G02B 6/0016; G02B 6/34; G02B 6/35; G02B 6/351; G02B 6/3534; G02B 6/3536; G02B 26/0808; G02B 2027/0123; G02B 2027/0125; G02B 2027/0132; G02B 2027/0134; G02B 2027/0136
See application file for complete search history.

(56) References Cited

U.S. PATENT DOCUMENTS

| | | | |
|---|---|---|---|
| 5,907,416 A | 5/1999 | Hegg et al. | |
| 7,206,107 B2 | 4/2007 | Levola | |
| 7,492,512 B2* | 2/2009 | Niv | G02B 23/18 359/407 |
| 7,764,413 B2 | 7/2010 | Levola | |
| 7,864,459 B2* | 1/2011 | Tohara | G02B 27/0172 359/811 |
| 8,213,064 B2* | 7/2012 | Yona | G02B 27/0101 353/30 |
| 8,314,993 B2 | 11/2012 | Levola | |
| 8,320,032 B2 | 11/2012 | Levola | |
| 8,508,848 B2 | 8/2013 | Saarikko | |
| 8,736,963 B2 | 5/2014 | Robbins et al. | |
| 8,743,464 B1 | 6/2014 | Amirparviz | |
| 8,903,207 B1* | 12/2014 | Brown | G02B 27/0103 359/1 |
| 9,244,280 B1* | 1/2016 | Tiana | G02B 27/0172 |
| 9,244,281 B1* | 1/2016 | Zimmerman | G02B 27/0176 |
| 9,497,380 B1* | 11/2016 | Jannard | H04N 5/23238 |
| 9,671,615 B1* | 6/2017 | Vallius | G02B 27/4205 |
| 2007/0188837 A1 | 8/2007 | Shimizu et al. | |
| 2009/0172589 A1* | 7/2009 | Brown | G06F 3/04845 715/787 |
| 2011/0187879 A1* | 8/2011 | Ochiai | G11B 27/034 348/222.1 |
| 2012/0218481 A1 | 8/2012 | Popovich et al. | |
| 2013/0208352 A1* | 8/2013 | Simmonds | G02B 6/34 359/350 |
| 2014/0043688 A1 | 2/2014 | Schrader | |
| 2014/0104665 A1 | 4/2014 | Popovich et al. | |
| 2014/0140653 A1 | 5/2014 | Brown et al. | |
| 2014/0168735 A1 | 6/2014 | Yuan et al. | |
| 2014/0267688 A1* | 9/2014 | Aich | H04N 7/181 348/113 |
| 2015/0062283 A1* | 3/2015 | Mintz | H04N 7/147 348/14.07 |
| 2015/0125109 A1 | 5/2015 | Robbins et al. | |
| 2015/0219842 A1 | 8/2015 | Sqalli et al. | |
| 2015/0234101 A1 | 8/2015 | Mercer | |
| 2015/0277116 A1 | 10/2015 | Richards et al. | |
| 2016/0286120 A1* | 9/2016 | Kuo | H04N 5/23222 |

OTHER PUBLICATIONS

Han, et al., "Portable Waveguide Display System with a Large Field of View by Integrating Freeform Elements and Volume Holograms", In Journal of Optics Express vol. 23, Issue 3, Feb. 4, 2015, (16 pages total).
"Schott® Wide Field of View Head Mounted Display", Published on: Jul. 2013Available at: http://www.schott.com/lightingimaging/english/download/hmd_display_int_july_2013.pdf (2 pages total).

* cited by examiner

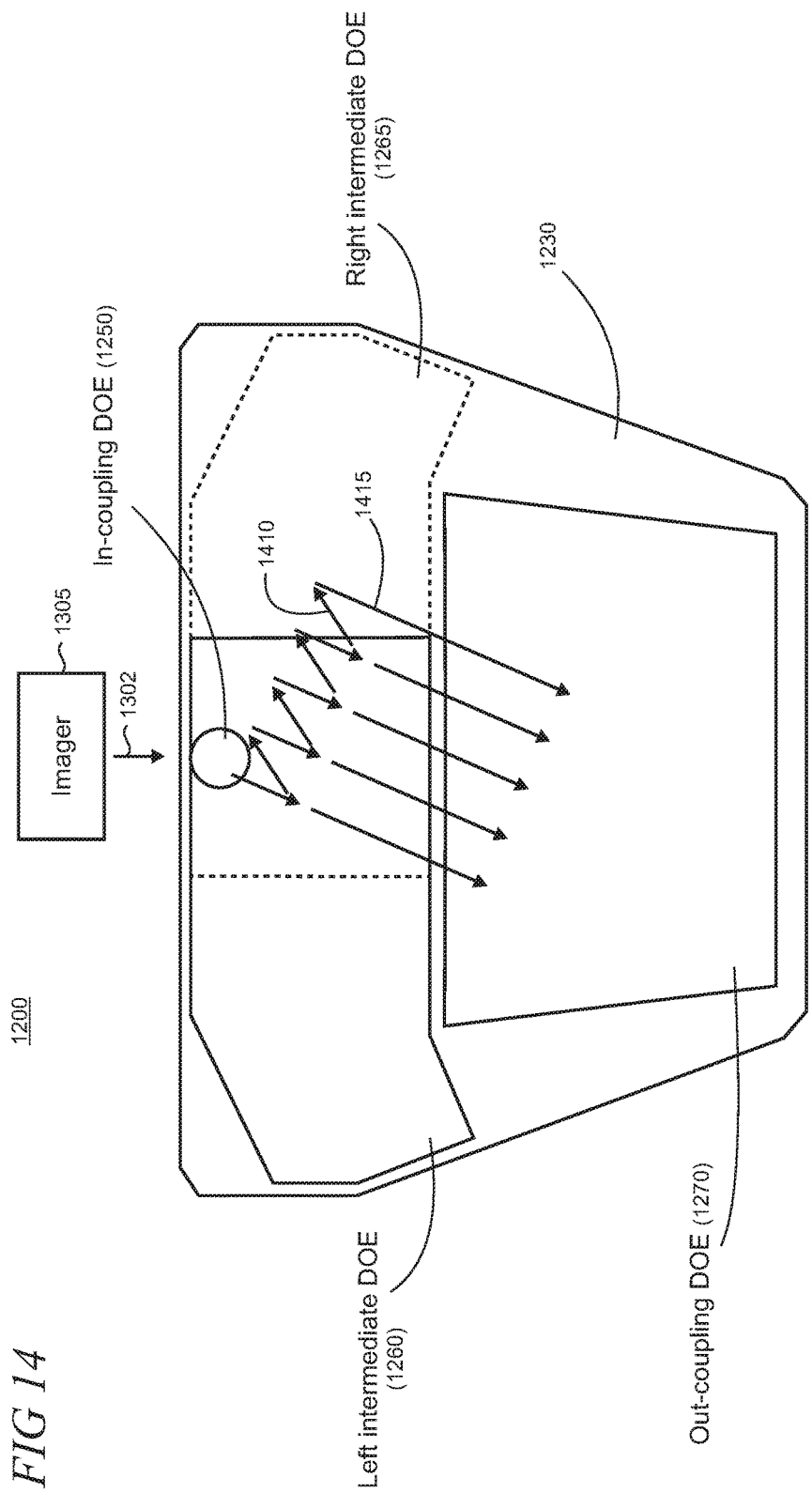

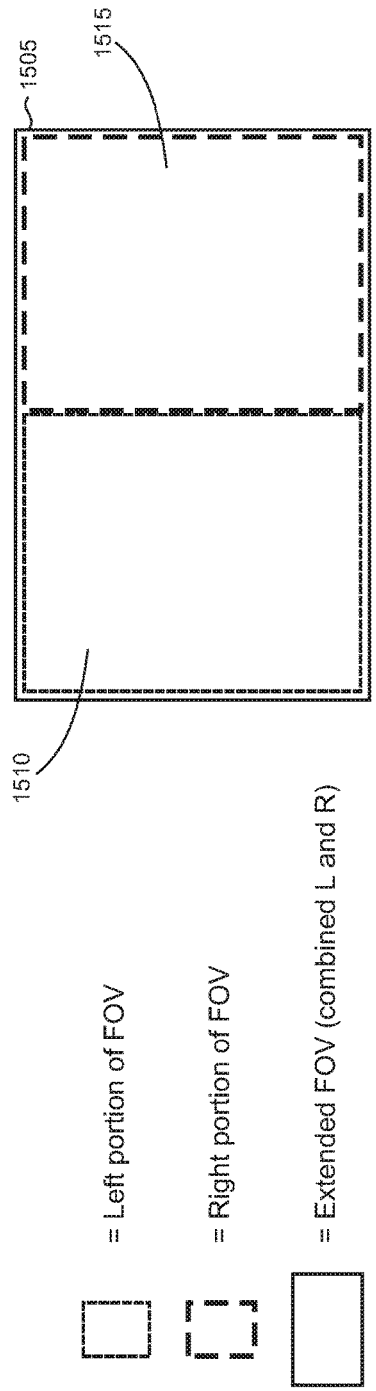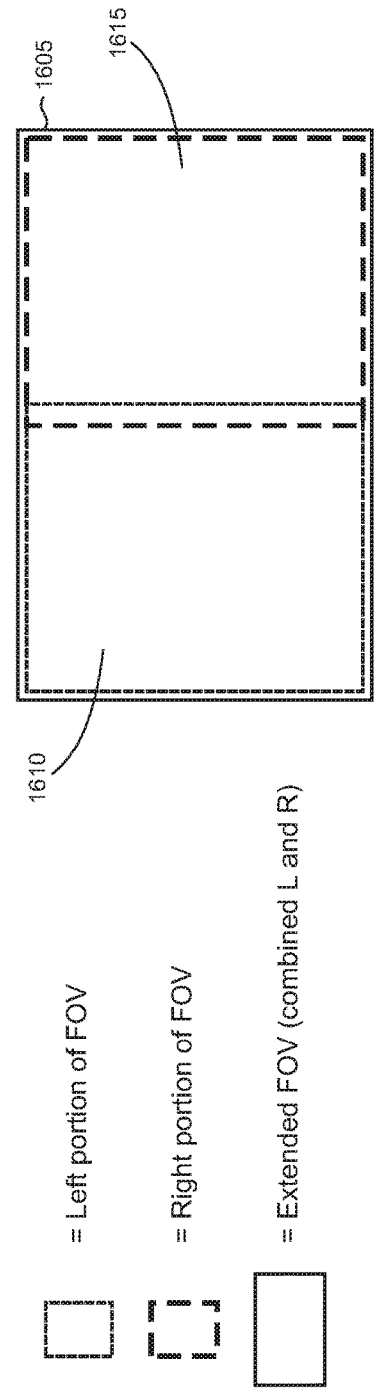

EXTENDED FIELD OF VIEW IN NEAR-EYE DISPLAY USING OPTICALLY STITCHED IMAGING

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

An extended field of view (FOV) is provided by an exit pupil expander in a near-eye display system that uses a waveguide with multiple DOEs for in-coupling light, expanding the pupil in two directions, and out-coupling light to a system user's eye. Left and right in-coupling DOEs are respectively located at left and right ends of the waveguide to in-couple pupils respectively produced by a pair of imagers. The FOV of the system is split into two parts—one imager provides a left portion of the FOV and the other imager provides the right portion. In-coupled light for the left portion of the FOV propagates in a left intermediate DOE (e.g., from left to right) which expands the pupil in a first direction. In-coupled light for the right portion of the FOV propagates in a right intermediate DOE (e.g., from right to left) which expands the pupil in the first direction. Light propagating in the left and right intermediate DOEs is diffracted (e.g., downwards) to a single out-coupling DOE which expands the pupil in a second direction and out-couples the light to the user's eye. The out-coupling DOE stitches the full FOV together by combining the left and right portions of the FOV produced by the imagers.

The exit pupil expander provides an FOV that is extended compared to that provided by conventional solutions in which a single in-coupling DOE and a single intermediate DOE are used. Such solutions typically provide a relatively narrow FOV as light can leak out of the waveguide at propagation angles that are outside the total internal reflection (TIR) limits of the waveguide. With the FOV split into two parts, the present exit pupil expander can propagate each portion of the FOV within the TIR limits for the waveguide and DOE materials. Each of the intermediate DOEs is configured so that the propagating light in each direction in the exit pupil expander (i.e., left to right and right to left) does not interact.

In another illustrative embodiment, an in-coupling DOE is centrally located in a waveguide and is configured to in-couple an entrance pupil produced by a single imager with an extended FOV. The in-coupled light propagates in opposite directions in left and right intermediate DOEs which steer respective left and right FOV portions. The exit pupil of light propagating in the left and right intermediate DOEs is expanded in a first direction and diffracted (e.g., downwards) to a single out-coupling DOE which expands the pupil in a second direction and out-couples the light to the user's eye. The out-coupling DOE stitches the full FOV together by combining the left and right portions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 14 shows imaging light for a right FOV portion propagating in an optical display;

FIG. 15 shows an illustrative example of an extended FOV that is out-coupled from an optical display in which the extended FOV is stitched from left and right FOV portions;

FIG. 16 shows an illustrative example of an extended FOV that is out-coupled from an optical display in which the extended FOV is stitched from left and right FOV portions with some overlap;

Like reference numerals indicate like elements in the drawings. Elements are not drawn to scale unless otherwise indicated.

DETAILED DESCRIPTION

Figure 1:
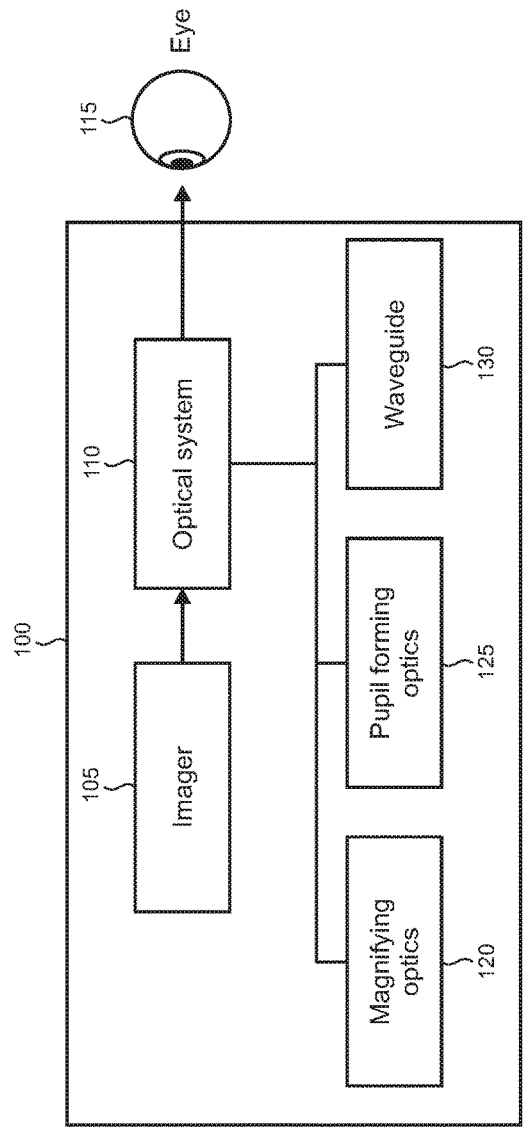
FIG. 1 shows a block diagram of an illustrative near-eye display system.

FIG. 1 shows a block diagram of an illustrative near-eye display system 100 which may incorporate a combination of diffractive optical elements (DOEs) that provide in-coupling of incident light into a waveguide, exit pupil expansion in two directions, and out-coupling of light out of the waveguide. Near-eye display systems are often used, for example, in head mounted display (HMD) devices in industrial, commercial, and consumer applications. Other devices and systems may also use near-eye systems, as described below. The near-eye display system 100 is an example that is used to provide context and illustrate various features and aspects of the present extended FOV using optically stitched imaging.

System 100 may include one or more imagers (representatively indicated by reference numeral 105) that work with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130. The imager 105 may include or incorporate an illumination unit and/or light engine (not shown) that may be configured to provide illumination in a range of wavelengths and intensities in some implementations.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the pupil forming optics 125 to form a pupil and the eye 115 acts as the last element in the optical chain and converts the light from the pupil into an image on the eye's retina as a virtual display.

Figure 2:
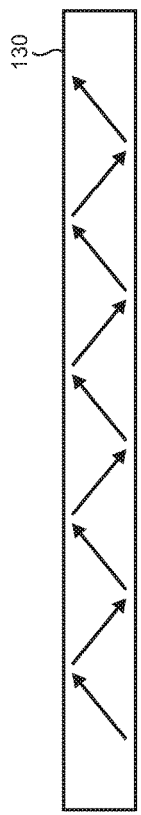
FIG. 2 shows propagation of light in a waveguide by total internal reflection (TIR)

The waveguide 130 facilitates light transmission between the imager and the eye. One or more waveguides can be utilized in the near-eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
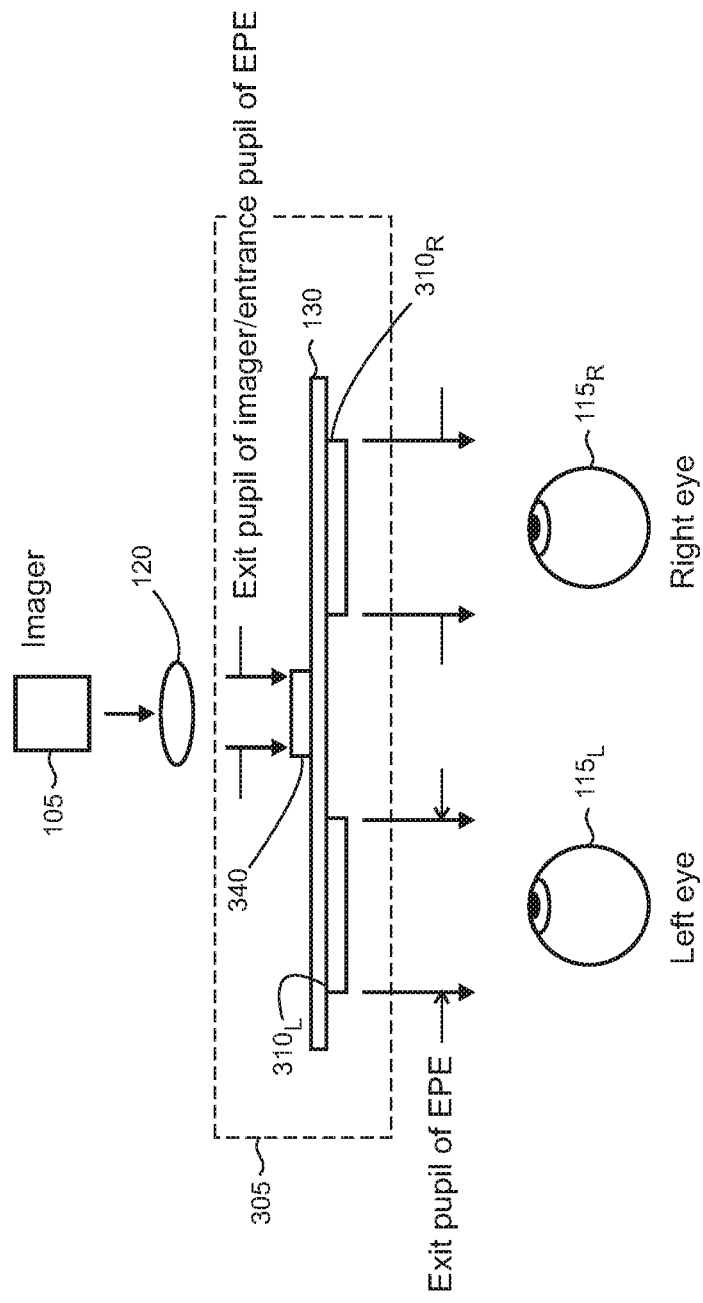
FIG. 3 shows a view of an illustrative exit pupil expander.

FIG. 3 shows a view of an illustrative exit pupil expander (EPE) 305. EPE 305 receives an input optical beam from the imager 105 through optics 120 (e.g., magnifying and/or collimating optics) as an entrance pupil to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements such as image resolution, field of view, and the like of a given optical system while enabling the imager and associated components to be relatively light and compact.

The EPE 305 is configured, in this illustrative example, to support binocular operation for both the left and right eyes which may support stereoscopic viewing. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 130 and a central in-coupling grating 340. The in-coupling and out-coupling gratings may be configured using multiple DOEs, as described below. While the EPE 305 is depicted as having a planar configuration, other shapes may also be utilized including, for example, curved or partially spherical shapes, in which case the gratings disposed thereon are non-coplanar.

Figure 4:
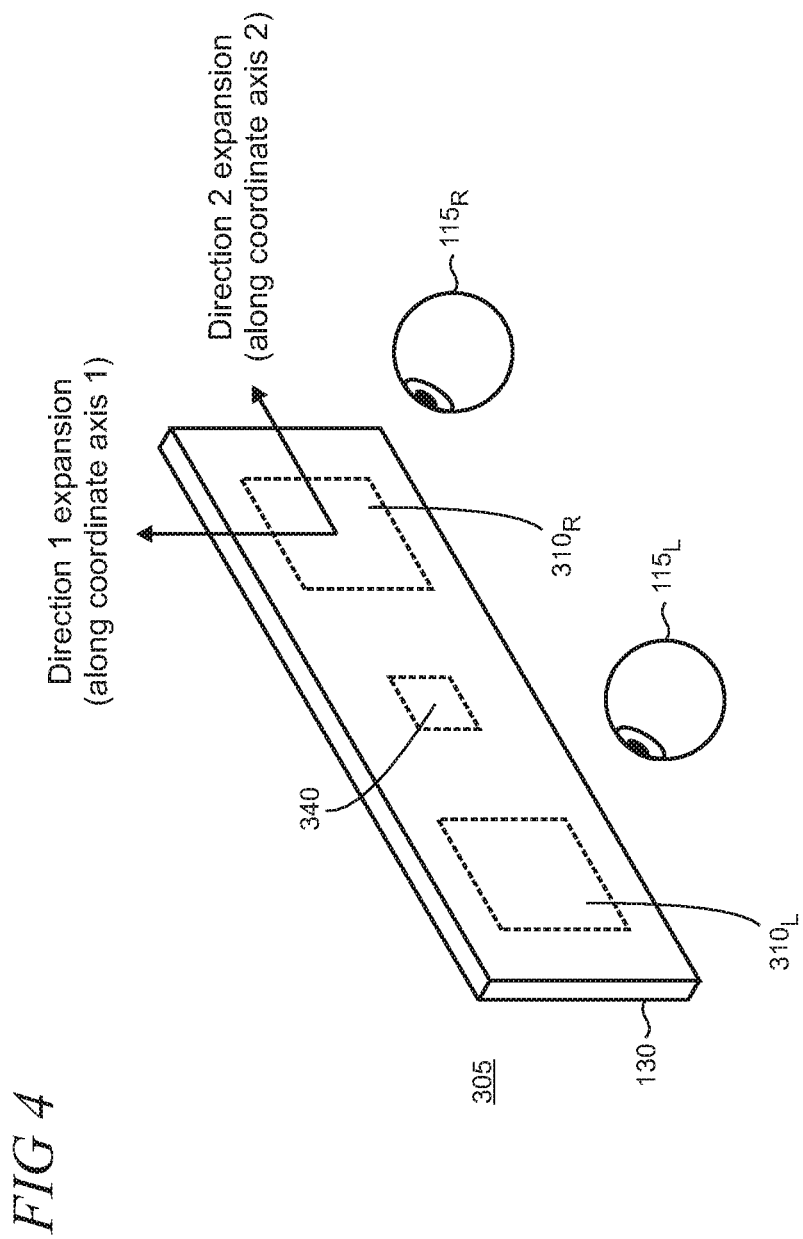
FIG. 4 shows a view of the illustrative exit pupil expander in which the exit pupil is expanded along two directions.
Figure 5:
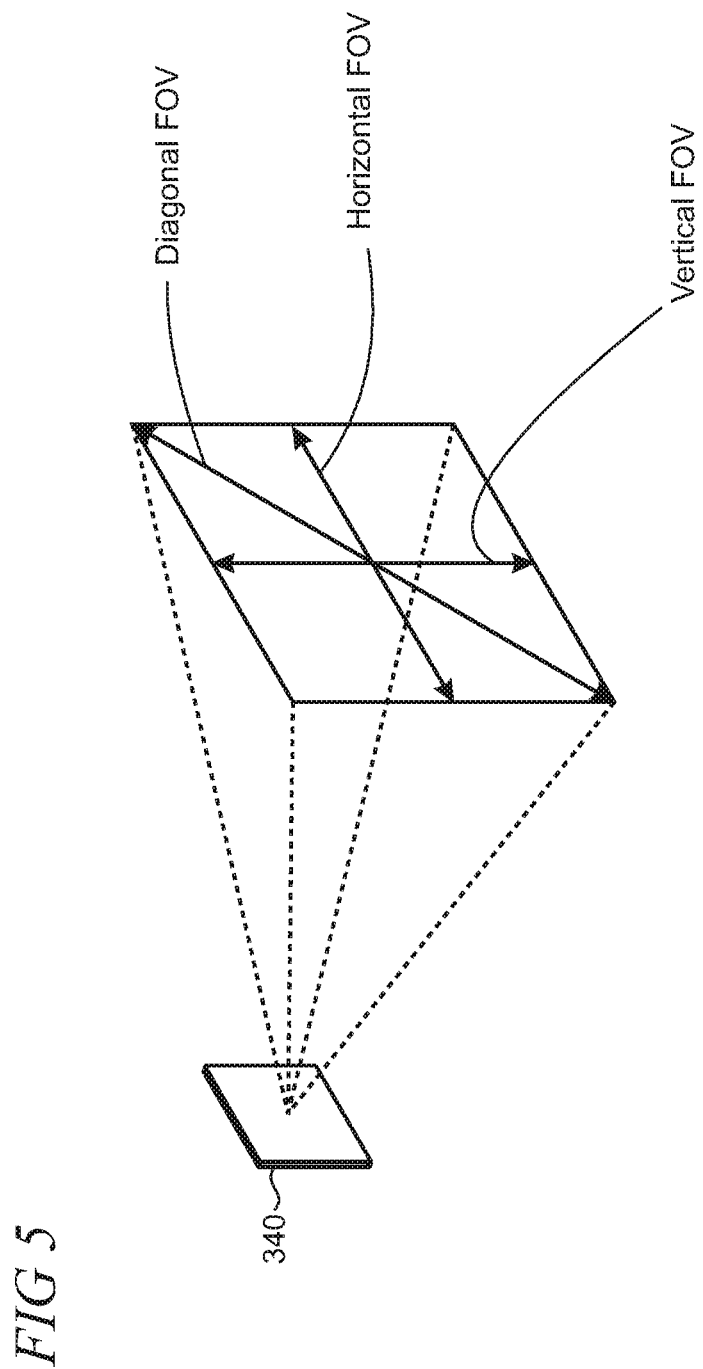
FIG. 5 shows an illustrative input pupil to an exit pupil expander in which the FOV is described by angles in horizontal, vertical, or diagonal orientations.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. The listed terms are not to be construed to limit the scope of the configurations (and usage scenarios therein) of near-eye display features utilized in the present extended FOV using optically stitched imaging. The entrance pupil to the EPE 305 at the in-coupling grating 340 is generally described in terms of FOV, for example, using horizontal FOV, vertical FOV, or diagonal FOV as shown in FIG. 5.

Figure 6:
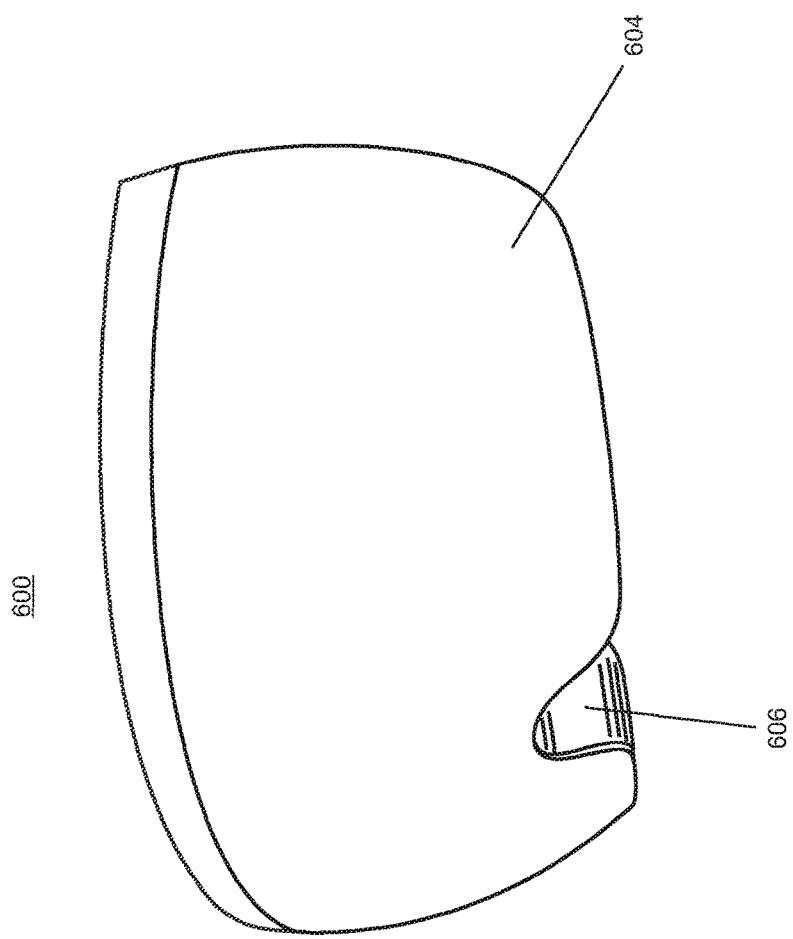
FIG. 6 shows a pictorial front view of a sealed visor that may be used as a component of an head mounted display (HMD) device.

Turning now to various implementation details of the present extended FOV using optically stitched imaging, FIG. 6 shows an illustrative example of a visor 600 that incorporates an internal near-eye display system that is used in a head mounted display (HMD) device application. The visor 600, in this example, is sealed to protect the internal near-eye display system. The visor 600 typically interfaces with other components of the HMD device (not shown) such as head mounting/retention systems and other subsystems including sensors, power management, controllers, etc., as illustratively described in conjunction with FIGS. 25 and 26. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including a near-eye display system 702 (shown in FIG. 7) when the HMD device is used in operation and during normal handling for cleaning and the like. The near-eye display system 702 includes left and right optical displays 710 and 715 that respectively provide virtual world images to the user's left and right eyes. The visor 600 can also protect the near-eye display system 702 from environmental elements and damage should the HMD device be dropped or bumped, impacted, etc.

Figure 7:
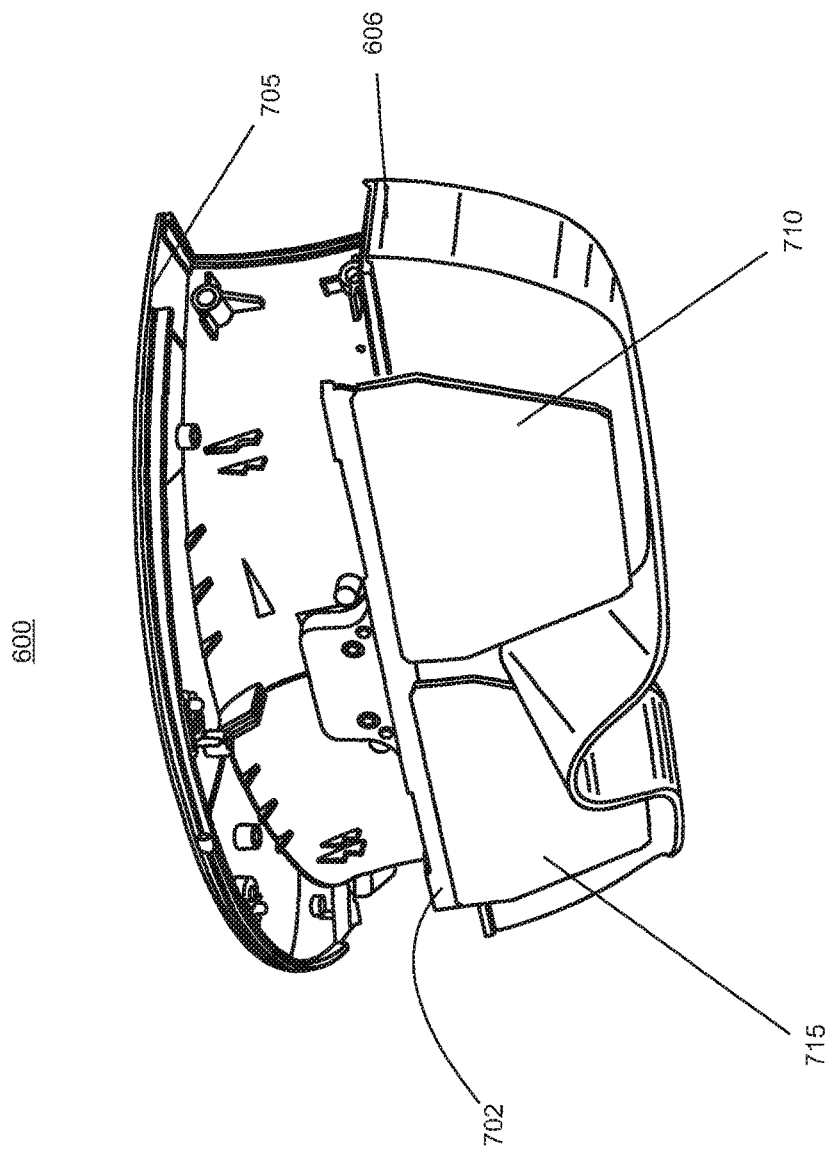
FIG. 7 shows a partially disassembled view of the sealed visor.

As shown in FIG. 7, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
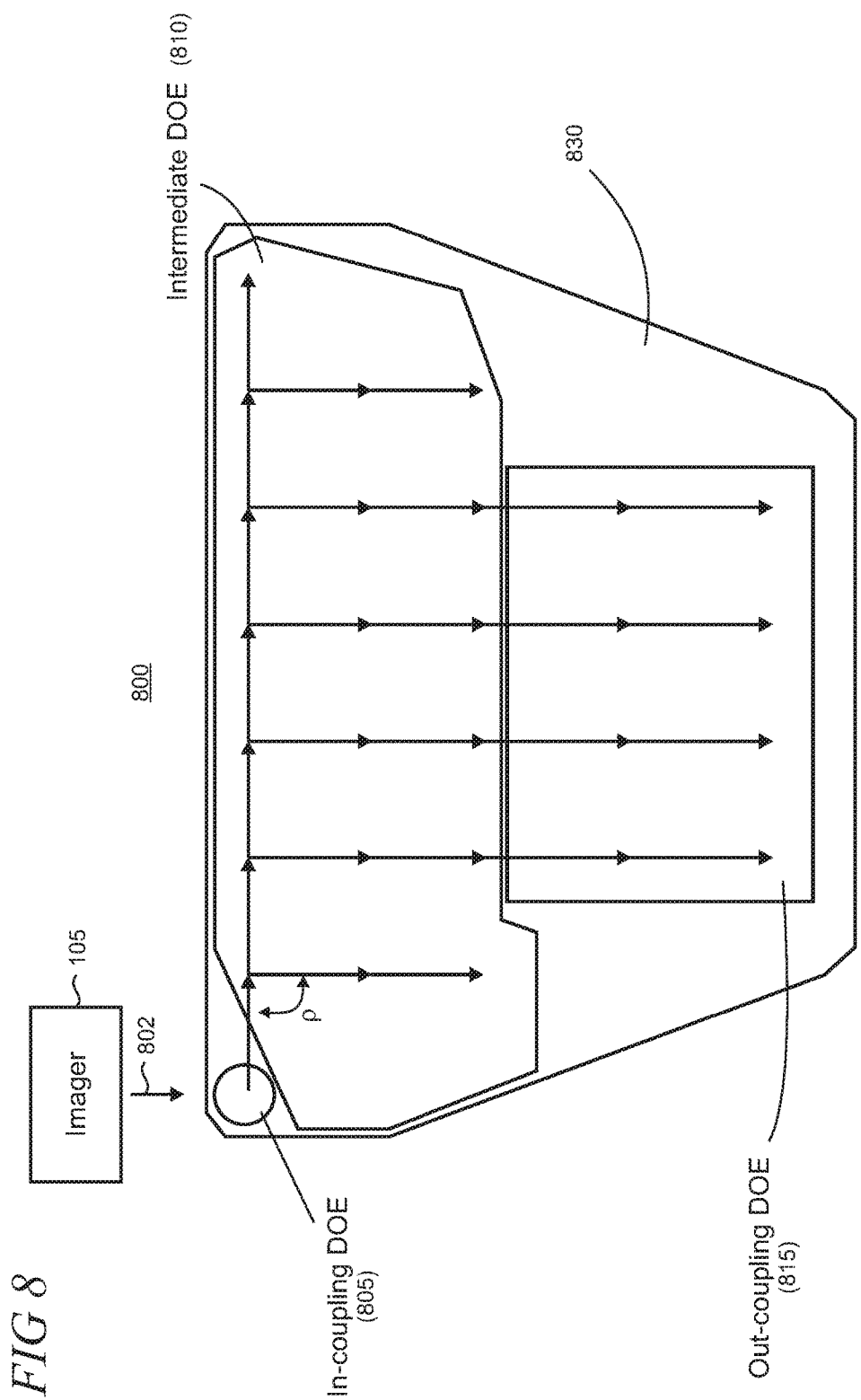
FIG. 8 shows an illustrative arrangement of three diffractive optical elements (DOEs) configured for in-coupling, exit pupil expansion, and out-coupling.

FIG. 8 shows an illustrative optical display 800 having three DOEs that may be used with, or incorporated as a part of, a waveguide 830 to provide in-coupling, expansion of the exit pupil in two directions, and out-coupling. The optical display 800 may be utilized in an exit pupil expander that is included in the near eye display system 702 (FIG. 7) to provide virtual world images to one of the user's eyes. Each DOE is an optical element comprising a periodic structure that can modulate various properties of light in a periodic pattern such as the direction of optical axis, optical path length, and the like.

The optical display 800 includes an in-coupling DOE 805, an out-coupling DOE 815, and an intermediate DOE 810 that couples light between the in-coupling and out-coupling DOEs. The in-coupling DOE 805 is configured to couple one or more imaging beams 802 from an imager 105 into the waveguide. The intermediate DOE 810 expands the exit pupil in a first direction along a first coordinate axis, and the out-coupling DOE 815 expands the exit pupil in a second direction along a second coordinate axis and couples light out of the waveguide to the user's eye. The angle ρ is a rotation angle between the periodic lines of the in-coupling DOE 805 and the intermediate DOE 810 as shown. As the light propagates in the intermediate DOE 810 (horizontally from left to right in the drawing), it is also diffracted (in the downward direction) to the out-coupling DOE 815.

The FOV of the entrance pupil to the in-coupling DOE is typically prescribed by the TIR limits of the optical materials used for the gratings and waveguides in the optical display. For example, the diagonal FOV can be 34 degrees. By comparison, the present near-eye display system using optically stitched imaging can extend the diagonal FOV to 90 degrees or more in some applications without increasing the system cost as may occur in conventional solutions using materials with higher refractive index to increase the TIR limits.

Figure 9:
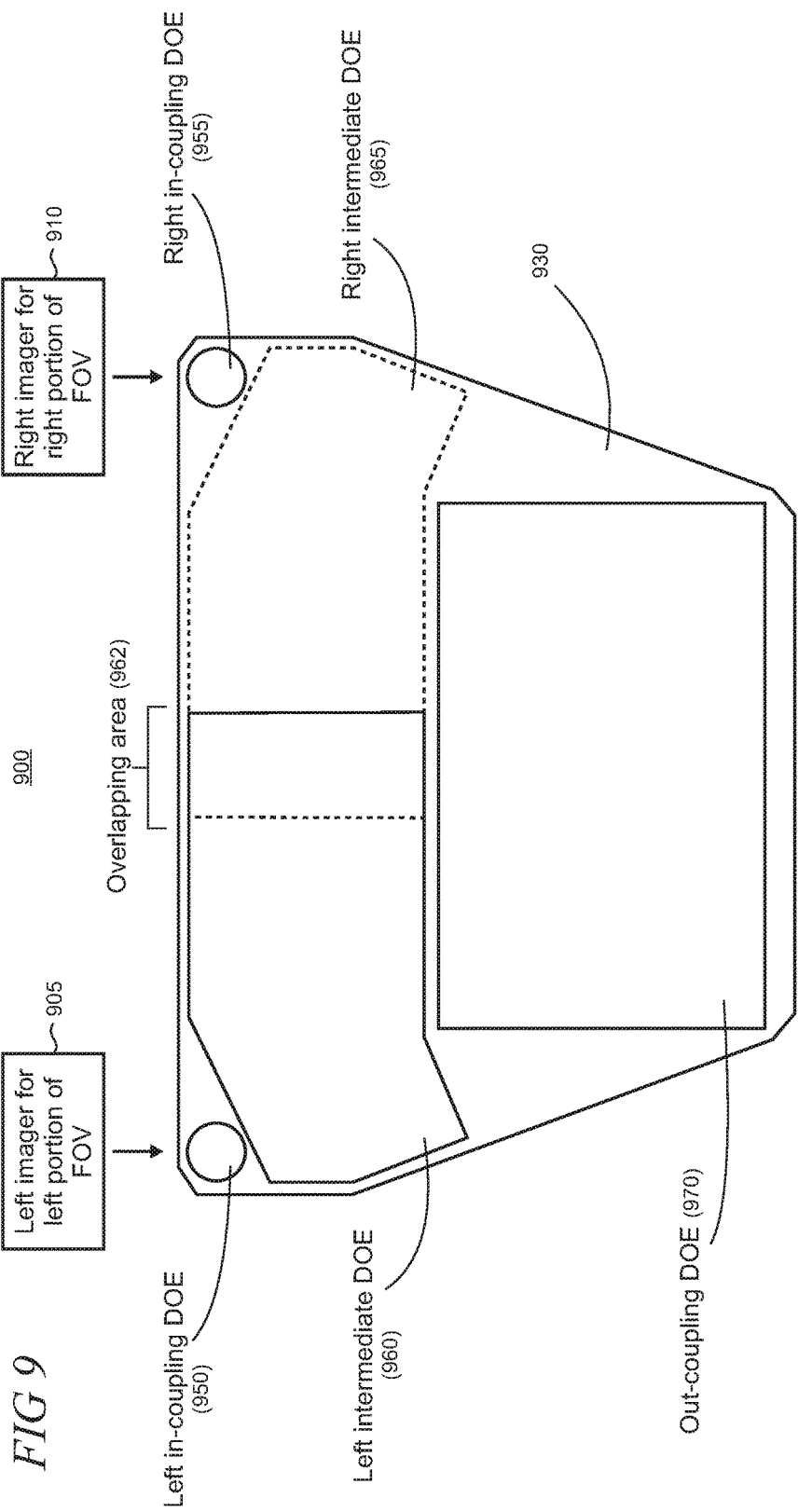
FIG. 9 shows an illustrative arrangement of five DOEs configured for in-coupling, exit pupil expansion, and out-coupling and which provide an extended field of view (FOV)

FIG. 9 shows an optical display 900 that may be used to implement the present extended FOV using optically stitched imaging. As shown, the optical display 900 includes having five DOEs that may be used with, or incorporated as a part of, a waveguide 930 to provide in-coupling, expansion of the exit pupil in two directions, and out-coupling. The optical display 900 may be utilized in an exit pupil expander that is included in the near eye display system 702 (FIG. 7) to provide virtual world images to one of the user's eyes. The FOV is split into two portions—a left portion and a right portion—and each FOV portion is provided by a separate imager (imagers 905 and 910, respectively). Each of the left and right portions uses an FOV that can propagate within the DOEs without leakage. The left and right portions are then optically stitched together at the out-coupling DOE to provide the extended FOV for the virtual images that are out-coupled from the display 900 to the user's eye. Thus, in one non-limiting illustrative example, the diagonal FOV of each of the left and right portions may be 30 degrees and the extended FOV of the optically stitched images is 60 degrees.

Two in-coupling DOEs 950 and 955, located at opposite ends of the waveguide 930, are utilized in the display 900. The in-coupling DOEs 950 and 955 can be on the same side of the waveguide 930, or be disposed on opposite sides. The in-coupling DOEs may be configured as wide-band polarization gratings in some cases, or be configured using surface relief grating features in a material having relatively higher refractive index to increase in-coupling efficiency. A left intermediate DOE 960 extends from the left edge to the center of the waveguide 930. A right intermediate DOE 965 extends from the right edge to the center of the waveguide 930. Each of the left and right intermediate DOEs expands the exit pupil in a first direction along a first coordinate axis. In this particular example, the left intermediate DOE 960 is disposed on the front side of the waveguide 930 and the right intermediate DOE 965 is disposed on the back side. That is, the left and right intermediate DOEs are located on opposite sides of the waveguide 930. In alternative implementations, however, the left and right intermediate waveguides can be disposed on the same side of the waveguide 930. The left and right intermediate DOEs have an overlapping area towards the center of the waveguide 930 as indicated by reference numeral 962. The left and right intermediate DOEs 960 and 965 couple light between respective left and right in-coupling DOEs 950 and 955 and a single out-coupling DOE 970 that is centrally located towards the bottom portion of the waveguide 930, as shown. The out-coupling DOE 970 expands the exit pupil in a second direction along a second coordinate axis and couples light out of the waveguide to the user's eye.

Figure 10:
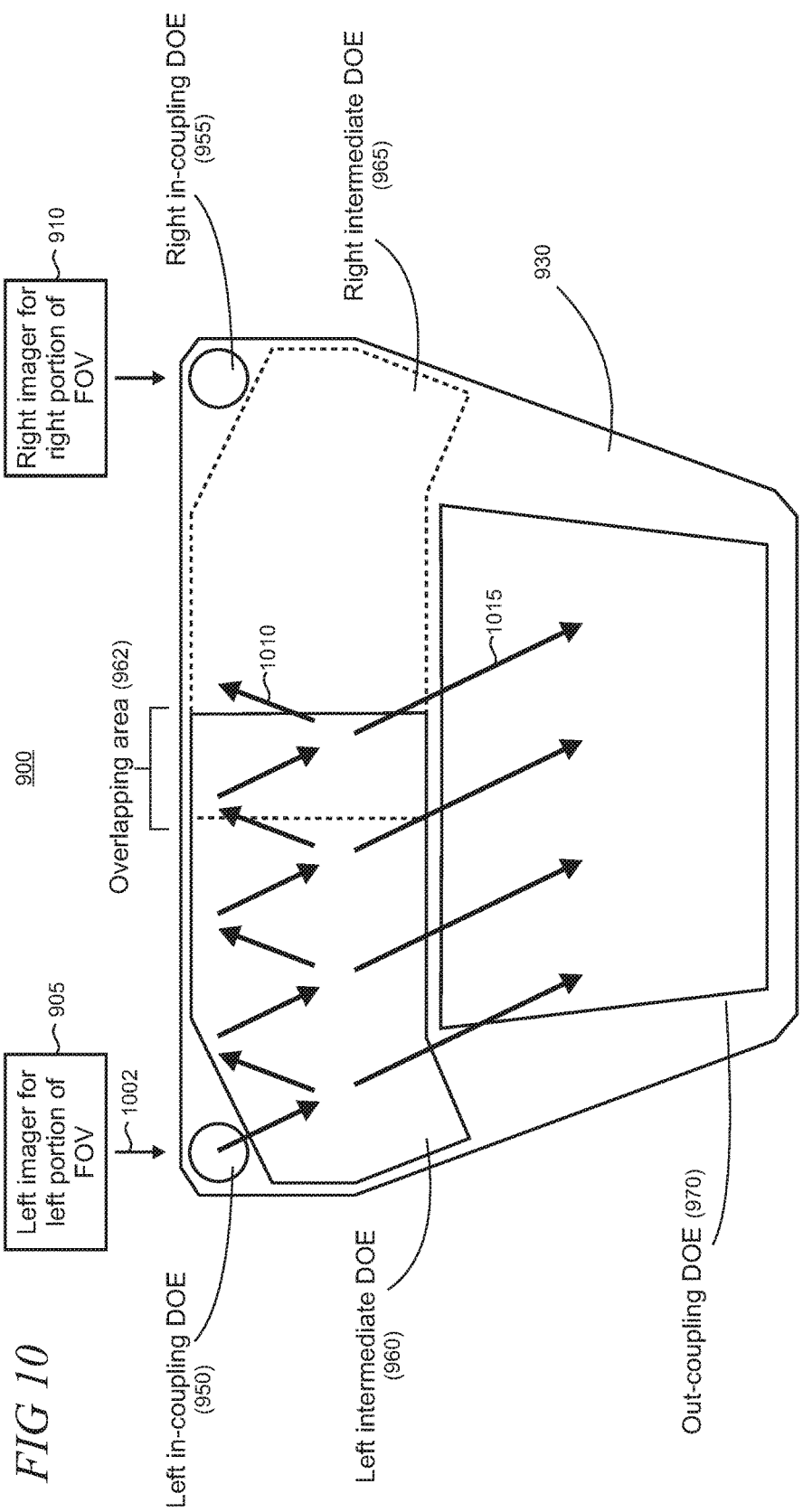
FIG. 10 shows imaging light for a left FOV portion propagating in an optical display.
Figure 11:
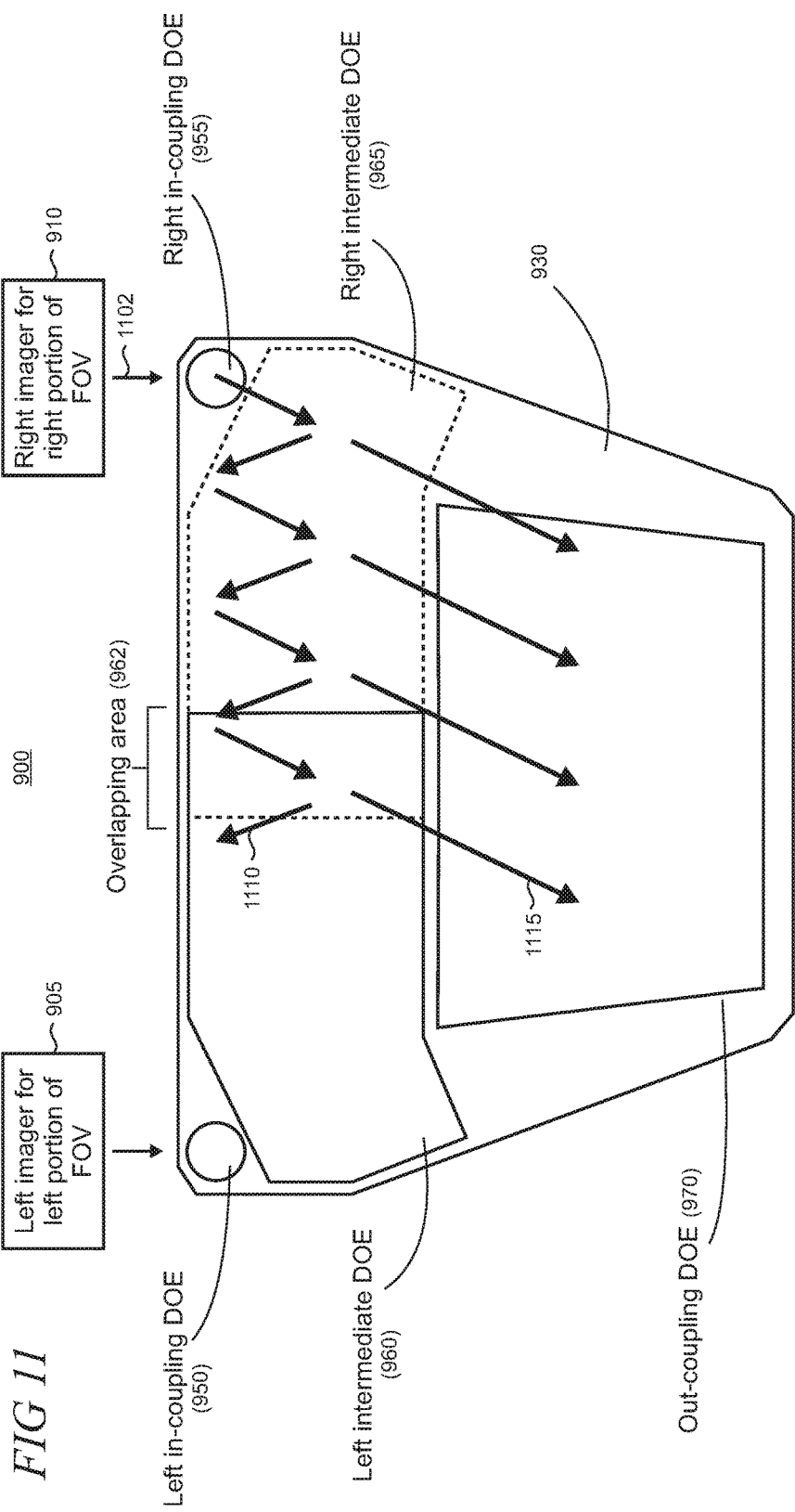
FIG. 11 shows imaging light for a right FOV portion propagating in an optical display.

As shown in FIG. 10, one or more imaging beams 1002 from the left imager 905 are in-coupled by the left in-coupling DOE 950 and propagate, from left to right in the left intermediate DOE 960 while also being diffracted downwards to the single out-coupling DOE 970. The left to right propagation is representatively indicated by reference numeral 1010 and the downward diffraction is representatively indicated by reference numeral 1015. As shown in FIG. 11, one or more imaging beams 1102 from the right imager 910 are in-coupled by the right in-coupling DOE 955 and propagate, from right to left in the right intermediate DOE 965 while also being diffracted downward to the single out-coupling DOE 970. The right to left propagation is representatively indicated by reference numeral 1110 and the downward diffraction is representatively indicated by reference numeral 1115.

Each of the intermediate DOEs 960 and 965 includes grating features that are configured so that each of the respective in-coupled pupils have an even number of diffractions when propagating, and also so that counter-propagating light from the other intermediate DOE does not interact with the forward-propagating light in that intermediate DOE. That is, by selecting various parameters such as grating period and grating orientation, each of the intermediate DOEs 960 and 965 is configured with two TIR propagation windows including one in the forward direction and another in the reverse (i.e., counter) direction. Accordingly, the left to right propagating light for the left FOV portion does not interact with the right to left propagating light for the right FOV portion in the intermediate DOEs. In some implementations, the left and right intermediate DOEs can be configured as polarization-sensitive gratings so that the respective FOV portions propagate in the intermediate DOEs with opposite (e.g., orthogonal) polarization states.

Figure 12:
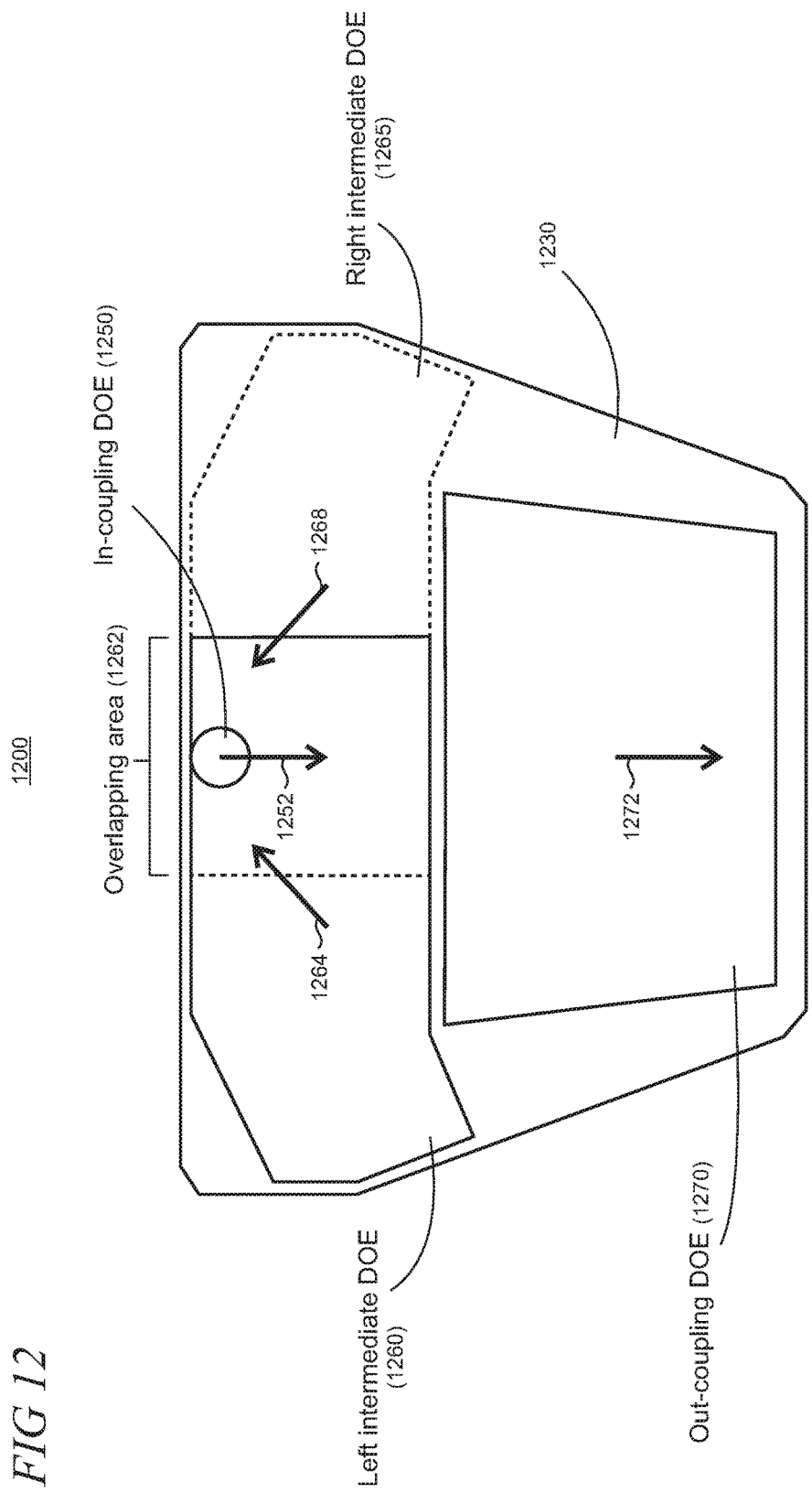
FIG. 12 shows an illustrative arrangement of four DOEs configured for in-coupling, exit pupil expansion, and out-coupling and which provide an extended FOV.

FIG. 12 shows an alternative illustrative example of an optical display 1200 using four DOEs in which a single in-coupling DOE 1250 is disposed towards the center of the waveguide 1230. Left and right intermediate DOEs 1260 and 1265 extend laterally from the central in-coupling DOE 1250 towards the edges of the waveguide 1230. Each of the left and right intermediate DOEs expands the exit pupil in a first direction along a first coordinate axis. The left and right intermediate DOEs can be disposed on the same side or on opposite sides of the waveguide 1230 and include an overlapping area 1262. A single out-coupling DOE 1270 is centrally located towards the bottom of the waveguide 1230. The out-coupling DOE 1270 expands the exit pupil in a second direction along a second coordinate axis and couples light out of the waveguide to the user's eye. The direction of the grating vector for each of the DOEs is indicated by reference numerals 1252 for the in-coupling DOE, 1264 for the left intermediate DOE, 1268 for the right intermediate DOE, and 1272 for the out-coupling DOE.

In a similar manner as with the intermediate DOEs in the optical display 900 (FIG. 9), each of the intermediate DOEs 1260 and 1265 includes grating features that are configured so that each of the respective in-coupled pupils have an even number of diffractions when propagating, and also so that counter-propagating light from the other intermediate DOE does not interact with the forward-propagating light in that intermediate DOE.

The left and right intermediate DOEs 1260 and 1265 are each configured to steer respective left and right portions of the entrance pupil FOV through application of evanescent diffraction orders. Light in the grating is scattered into several "orders" of both transmitted and reflected light. The diffraction orders exist at varying angles of incidence to the DOE depending on wavelength, grating period, and other grating characteristics. Diffracted plane waves in the left and right intermediate DOEs may be either propagating or evanescent depending on diffraction order. Each intermediate DOE is configured to steer a desired portion of the FOV based on propagating diffraction orders while the unwanted (i.e., non-steered) portion of the FOV has evanescent diffraction orders and is cut off.

Figure 13:
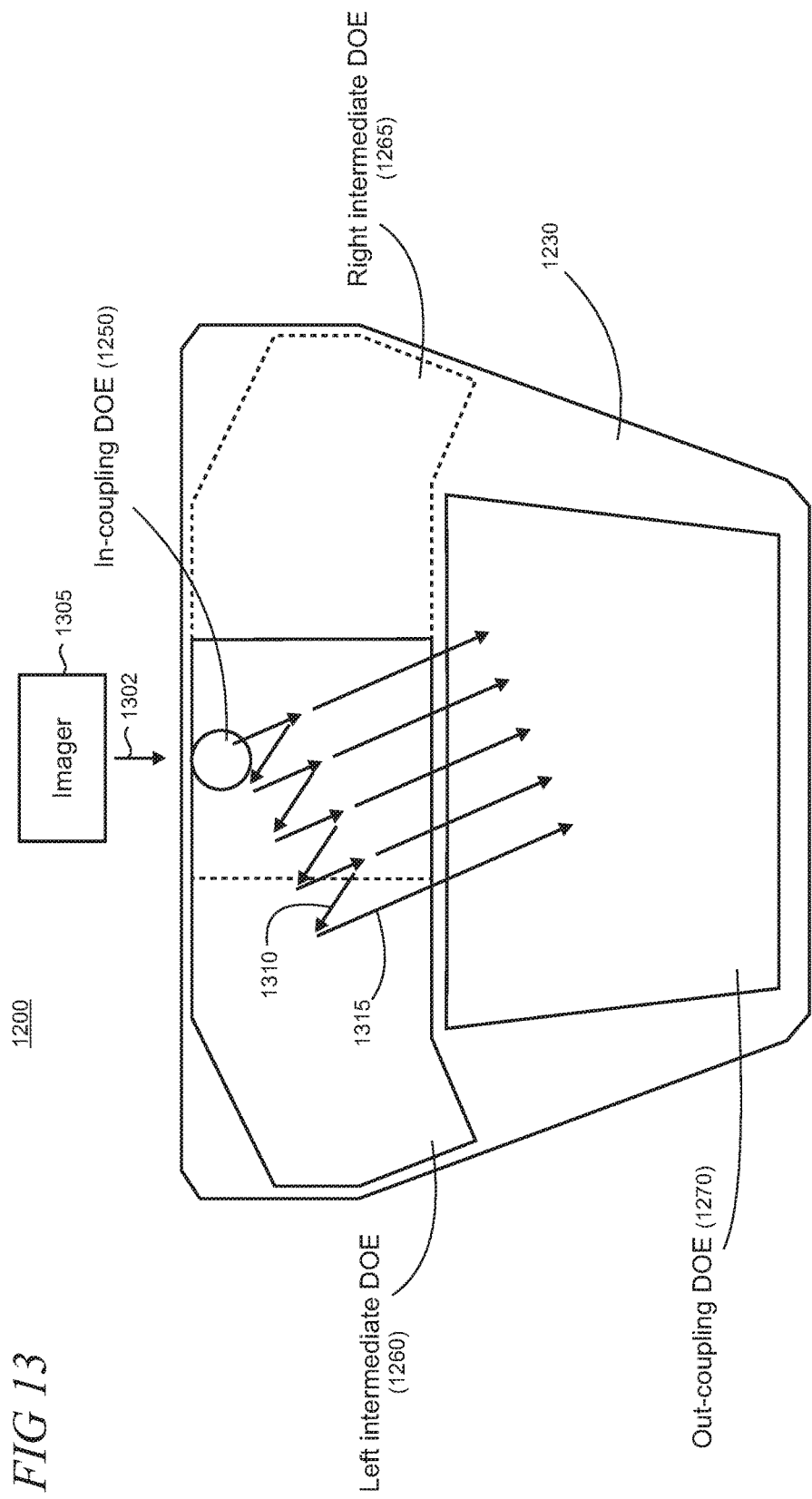
FIG. 13 shows imaging light for a left FOV portion propagating in an optical display.

As shown in FIG. 13, one or more imaging beams 1302 from a single imager 1305 are in-coupled by the in-coupling DOE 1250 as an entrance pupil with a full, extended FOV. Through evanescent diffraction orders, a left FOV portion of the entrance pupil propagates, from right to left, in the left intermediate DOE 1260 while also being diffracted downwards to the single out-coupling DOE 1270. The right to left propagation is representatively indicated by reference numeral 1310 and the downward diffraction is representatively indicated by reference numeral 1315. As shown in FIG. 14, a right FOV portion of the entrance pupil propagates, from left to right, in the right intermediate DOE 1265 while also being diffracted downwards to the single out-coupling DOE 1270. The left to right propagation is representatively indicated by reference numeral 1410 and the downward diffraction is representatively indicated by reference numeral 1415.

FIG. 15 shows an illustrative example of an extended FOV 1505 that is out-coupled from the optical display 900 (FIG. 9) or the optical display 1200 (FIG. 12) in which the extended FOV 1505 is optically stitched from left and right FOV portions 1510 and 1515. As shown, the left and right FOV portions 1510 and 1515 are respectively positioned in a symmetrical manner within the extended FOV 1505 so that their edges are aligned around the center. The left and right FOV portions 1510 and 1515 in this example are configured to have similar sizes. In alternative implementations, the left and right portions of the extended FOV can be different sizes so that the extended FOV is asymmetrically configured and the edges of the respective FOV portions are not aligned towards the center of the extended FOV.

FIG. 16 shows an illustrative example of an extended FOV 1605 that is out-coupled from an optical display 900 (FIG. 9) or the optical display 1200 (FIG. 12) in which the extended FOV 1605 is optically stitched from left and right FOV portions 1610 and 1615 with some overlap. The degree of overlap can vary by implementation. The left and right FOV portions are approximately the same size and symmetrically oriented, however, as with the example shown in FIG. 15, the FOV portions can be of different sizes in some implementations so that the portions are asymmetrically oriented within the extended FOV 1605.

In some implementations, various parameters associated with the left and right imagers 905 and 910 (FIG. 9) can be selected to optimize the presentation of the images for each FOV portion in the extended FOV. For example, color fidelity and intensity can be adjusted at each imager so that the images appear consistent and uniform across the entire extended FOV. Increases in imager operating efficiency may also be realized in some cases because each imager only needs to produce images over its own smaller portion of the FOV and not over the larger, extended FOV. Such energy savings can be important, particularly in battery-operated devices such as HMDs.

Figure 17:
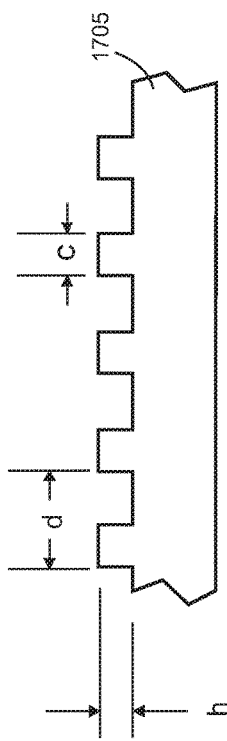
FIG. 17 shows a profile of a portion of an illustrative diffraction grating that has straight gratings.
Figure 18:
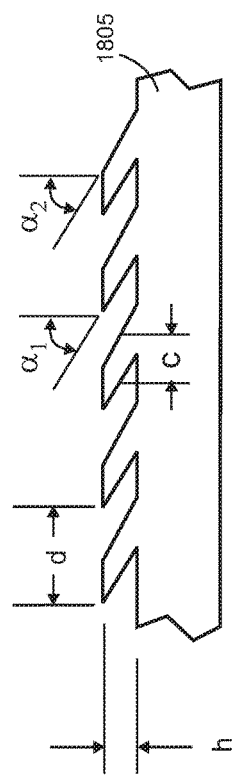
FIG. 18 shows an asymmetric profile of a portion of an illustrative diffraction grating that has asymmetric or slanted gratings.

The grating features used in the DOEs in the optical displays 900 and 1200 (FIGS. 9 and 12) can take various suitable forms. For example, FIG. 17 shows a profile of straight (i.e., non-slanted) grating features 1700 (referred to as grating bars, grating lines, or simply "gratings"), that are formed in a substrate 1705. By comparison, FIG. 18 shows grating features 1800 formed in a substrate 1805 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 17 and 18, the grating period is represented by d, the grating height by h, the bar width by c, and the filling factor by f, where f=c/d. The slanted gratings in FIG. 18 may be described by slant angles $\alpha_1$ and $\alpha_2$.

FIGS. 19-22 show various illustrative two-dimensional (2D) diffraction gratings which may be utilized in implementations in which the left and right intermediate DOEs are on the same side of the waveguide 930 (FIG. 9) or waveguide 1230 (FIG. 12) and the overlapping areas implemented with a crossed-grating structure. The 2D gratings may also be utilized to impart polarization sensitivity to a DOE (e.g., an in-coupling DOE and/or an intermediate DOE). The 2D gratings in the FIGS. 19-22 are intended to be illustrative and not limiting, and it is contemplated that variations from the 2D gratings shown may also be utilized. Gratings may include symmetric and/or asymmetric features including slanted gratings (i.e., gratings having walls that are non-orthogonal according to one or more predetermined angles to a plane of the waveguide) and blazed gratings (i.e., gratings having asymmetric triangular or sawtooth profiles) in some cases. Various suitable surface relief contours, filling factors, grating periods, and grating dimensions can also be utilized according to the needs of a particular implementation.

Figure 20:
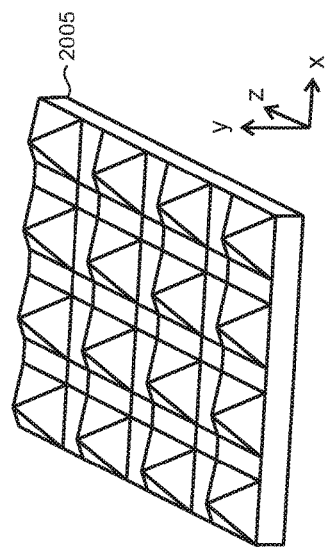
FIGS. 19-22 show various illustrative two-dimensional diffraction gratings.
Figure 22:
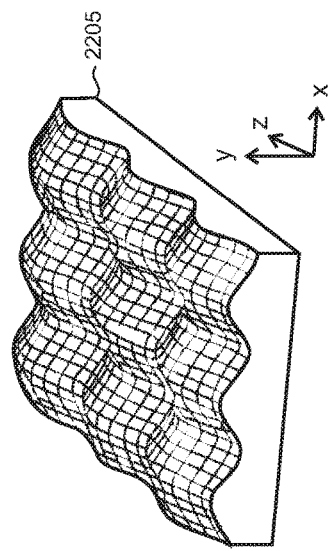
Figure 19:
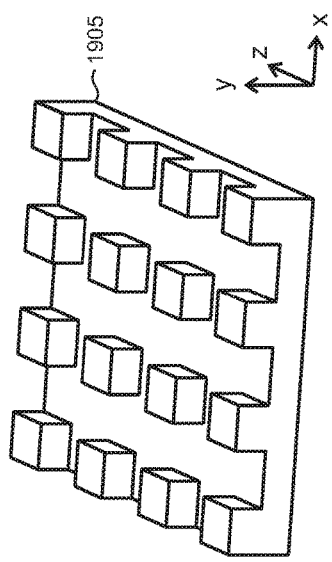
Figure 21:
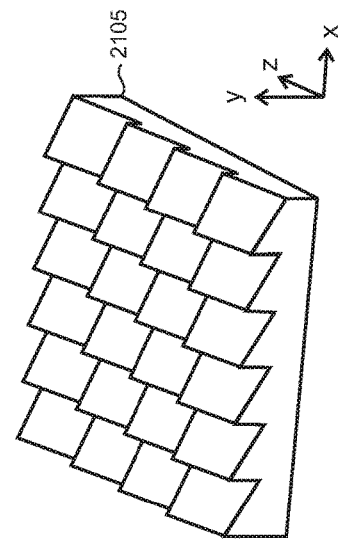

FIG. 19 shows a 2D grating 1905 that includes quadrangular elements that project from a substrate. The quadrangular elements can also be configured to be asymmetric such as being slanted or blazed. Non-quadrangular three-dimensional geometries (both symmetric and asymmetric) may also be utilized for a 2D grating including, for example, cylindrical elements, polygonal elements, elliptical elements, or the like. For example, FIG. 20 shows a 2D grating 2005 that includes pyramidal elements, and FIG. 21 shows a 2D grating 2105 that includes elements that have a blazed profile in each of the x and z directions. Gratings may also have elements with curved profiles, as shown in the illustrative 2D grating 2205 in FIG. 22.

Figure 23:
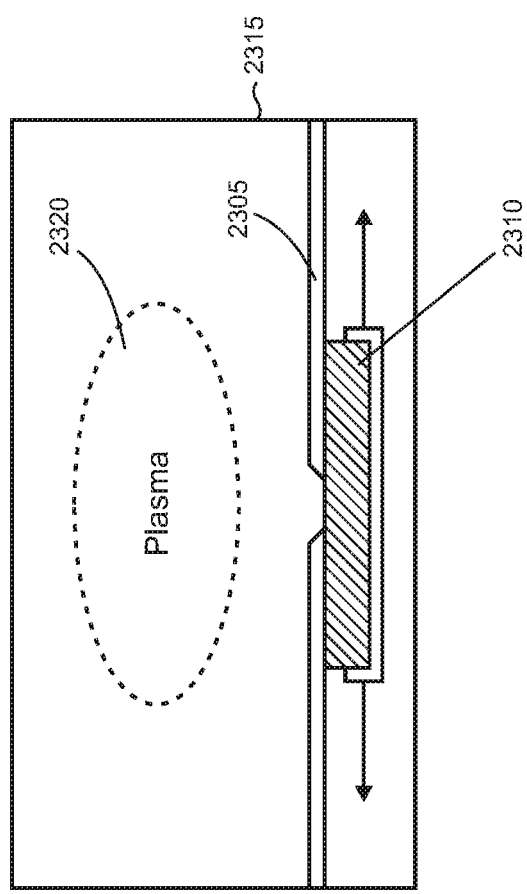
FIG. 23 shows an illustrative arrangement for DOE fabrication using a mask that moves relative to a substrate.

FIG. 23 shows an illustrative arrangement for DOE fabrication using a mask 2305 that moves relative to a photosensitive grating substrate 2310 within an enclosure 2315. A reactive ion etching plasma 2320 is used to adjust the thickness of the etching on the grating substrate at various positions by moving the substrate relative to the mask using, for example, a computer-controller stepper functionality or other suitable control system. In an illustrative example, the etching may be performed using a reactive ion beam etching (RIBE). However, other variations of ion beam etching may be utilized in various implementations including, for example, magnetron reactive ion etching (MRIE), high density plasma etching (HDP), transformer coupled plasma etching (TCP), inductively coupled plasma etching (ICP), and electron cyclotron resonance plasma etching (ECR).

By controlling the exposure of the substrate to the plasma through the mask aperture, grating depth can be varied as a function of position over the extent of the substrate. The resulting microstructure on the substrate may be replicated for mass production in a lightweight polymer material using one of cast-and-cure, embossing, compression molding, or compression injection molding, for example.

Figure 24:
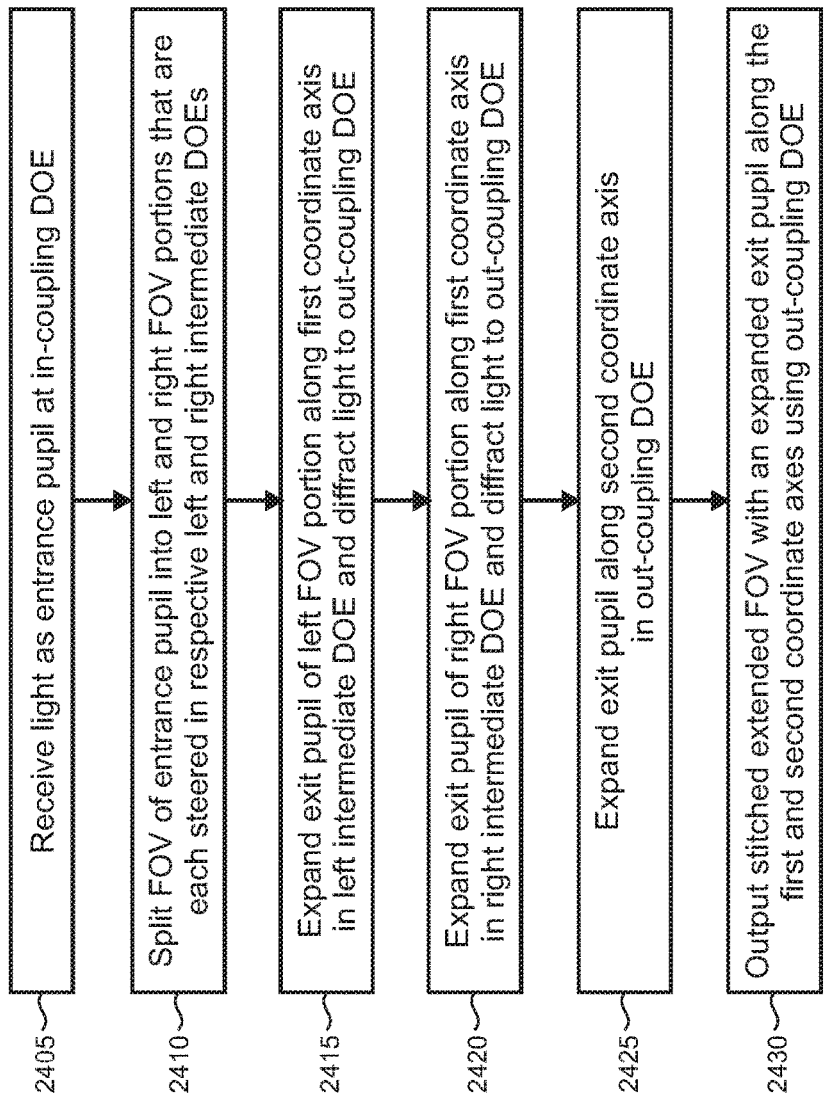
FIG. 24 shows an illustrative method.

FIG. 24 is a flowchart of an illustrative method 2400. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2405, light is received at an in-coupling DOE (e.g., in-coupling DOE 1250 in the near-eye display system 1200 shown in FIG. 12 and described in the accompanying text). The in-coupling DOE is disposed in an exit pupil expander and interfaces with the downstream left and right intermediate DOEs (e.g., DOEs 1260 and 1265) that are disposed in the exit pupil expander. The in-coupling DOE is configured to in-couple light from an imager (e.g., imager 1305 in FIG. 13) as an entrance pupil that provides a full FOV (i.e., an extended FOV) supported by system.

In step 2410, the FOV of the entrance pupil is split into left and right portions. The splitting can be implemented using evanescent diffraction orders as described above in which each of the left and right intermediate DOEs selects a portion of the FOV to steer based on propagating diffraction orders while cutting off the unwanted portion of the FOV that has evanescent diffraction orders. The full FOV is greater than each of FOV portions. In step 2415, the exit pupil of the left FOV portion is expanded along a first coordinate axis in the left intermediate DOE and the light is diffracted to an out-coupling grating (e.g., out-coupling grating 1270 in FIG. 12). In step 2420, the exit pupil of the right FOV portion is expanded along the first coordinate axis in the right intermediate DOE and the light is diffracted to the out-coupling grating. Light in the intermediate DOEs propagates in opposite directions and/or with opposite (i.e., orthogonal states of polarization).

In step 2425, the exit pupil is expanded in the out-coupling DOE. In step 2430, the out-coupling DOE stitches both FOV portions together into the full, extended FOV and outputs light to the user's eye with an expanded exit pupil relative to the received light from the imager along the first and second coordinate axes. The full FOV can comprise the FOV portions that are stitched in symmetric or asymmetric configurations.

Figure 25:
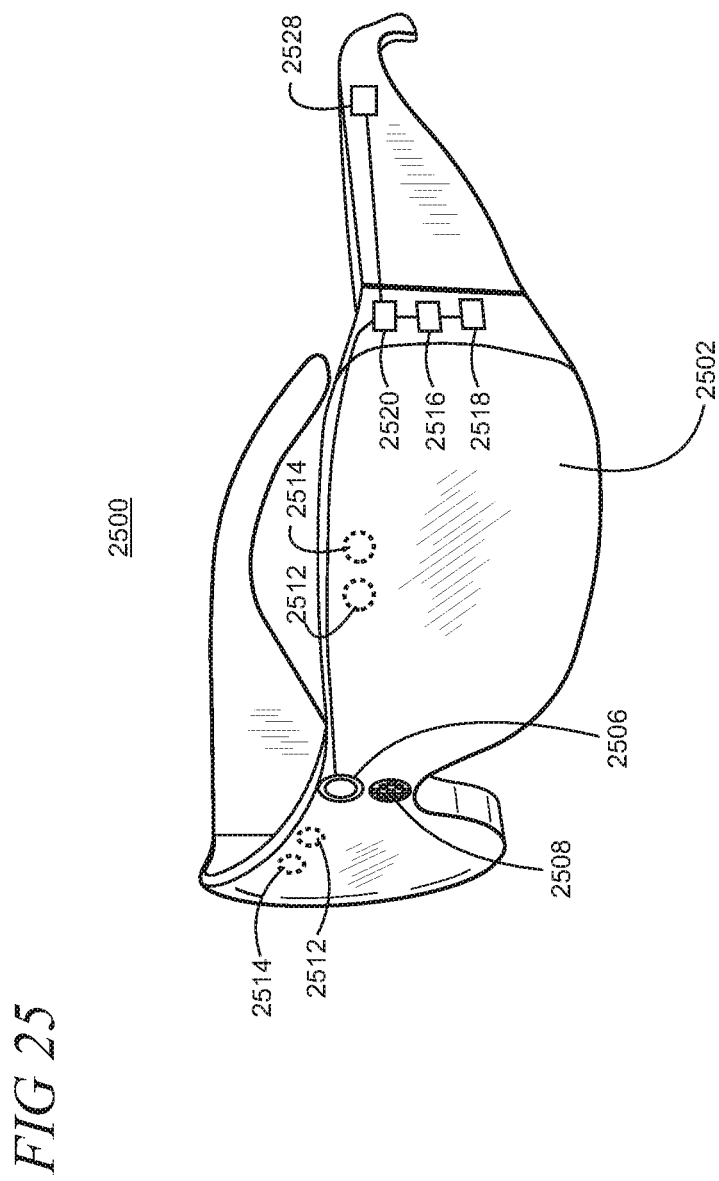
FIG. 25 is a pictorial view of an illustrative example of a virtual reality or mixed reality HMD device.
Figure 26:
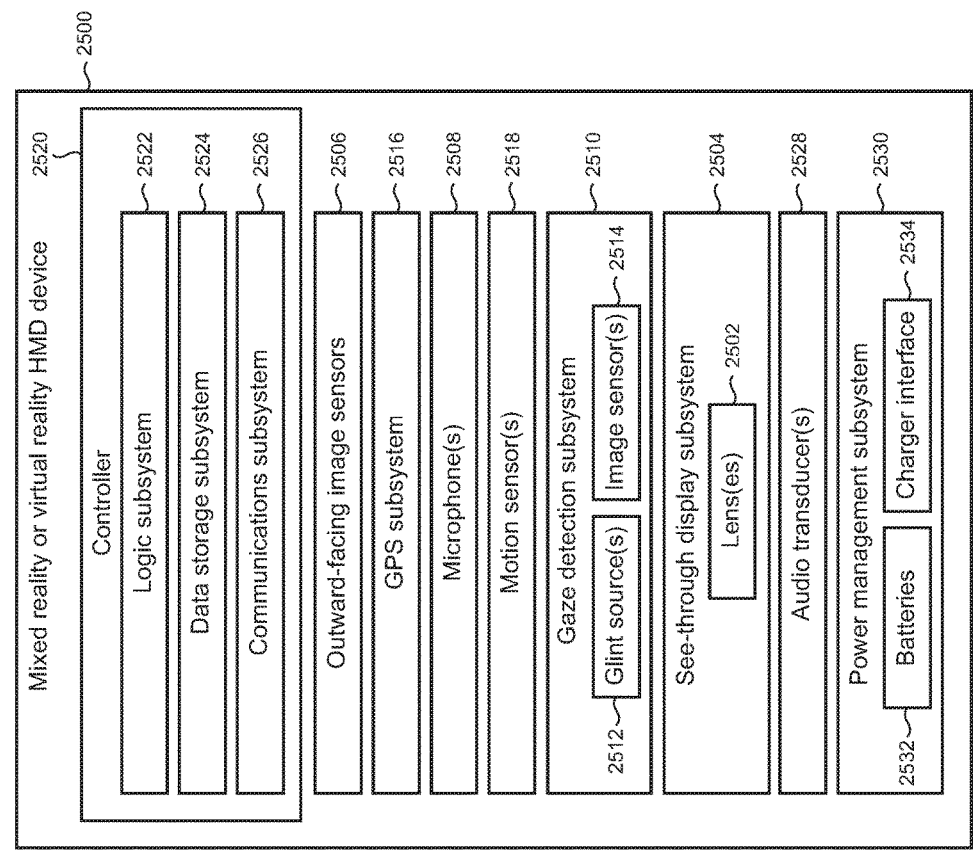
FIG. 26 shows a block diagram of an illustrative example of a virtual reality or mixed reality HMD device.

FIG. 25 shows one particular illustrative example of a see-through, mixed reality or virtual reality HMD device 2500, and FIG. 26 shows a functional block diagram of the device 2500. HMD device 2500 comprises one or more lenses 2502 that form a part of a see-through display subsystem 2504, so that images may be displayed using lenses 2502 (e.g. using projection onto lenses 2502, one or more waveguide systems, such as a near-eye display system, incorporated into the lenses 2502, and/or in any other suitable manner). HMD device 2500 further comprises one or more outward-facing image sensors 2506 configured to acquire images of a background scene and/or physical environment being viewed by a user, and may include one or more microphones 2508 configured to detect sounds, such as voice commands from a user. Outward-facing image sensors 2506 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 2500 may further include a gaze detection subsystem 2510 configured for detecting a direction of gaze of each eye of a user or a direction or location of focus, as described above. Gaze detection subsystem 2510 may be configured to determine gaze directions of each of a user's eyes in any suitable manner. For example, in the illustrative example shown, a gaze detection subsystem 2510 includes one or more glint sources 2512, such as infrared light sources, that are configured to cause a glint of light to reflect from each eyeball of a user, and one or more image sensors 2514, such as inward-facing sensors, that are configured to capture an image of each eyeball of the user. Changes in the glints from the user's eyeballs and/or a location of a user's pupil, as determined from image data gathered using the image sensor(s) 2514, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2510 may have any suitable number and arrangement of light sources and image sensors. In some implementations, the gaze detection subsystem 2510 may be omitted.

The HMD device 2500 may also include additional sensors. For example, HMD device 2500 may comprise a global positioning system (GPS) subsystem 2516 to allow a location of the HMD device 2500 to be determined. This may help to identify real-world objects, such as buildings, etc. that may be located in the user's adjoining physical environment.

The HMD device 2500 may further include one or more motion sensors 2518 (e.g., inertial, multi-axis gyroscopic, or acceleration sensors) to detect movement and position/ orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 2506. The use of motion data may allow changes in gaze location to be tracked even if image data from outward-facing image sensor(s) 2506 cannot be resolved.

In addition, motion sensors 2518, as well as microphone (s) 2508 and gaze detection subsystem 2510, also may be employed as user input devices, such that a user may interact with the HMD device 2500 via gestures of the eye, neck and/or head, as well as via verbal commands in some cases. It may be understood that sensors illustrated in FIGS. 25 and 26 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2500 can further include a controller 2520 such as one or more processors having a logic subsystem 2522 and a data storage subsystem 2524 in communication with the sensors, gaze detection subsystem 2510, display subsystem 2504, and/or other components through a communications subsystem 2526. The communications subsystem 2526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2524 may include instructions stored thereon that are executable by logic subsystem 2522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2500 is configured with one or more audio transducers 2528 (e.g., speakers, earphones, etc.) so that audio can be utilized as part of a mixed reality or virtual reality experience. A power management subsystem 2530 may include one or more batteries 2532 and/or protection circuit modules (PCMs) and an associated charger interface 2534 and/or remote power interface for supplying power to components in the HMD device 2500.

It may be appreciated that the HMD device 2500 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 27:
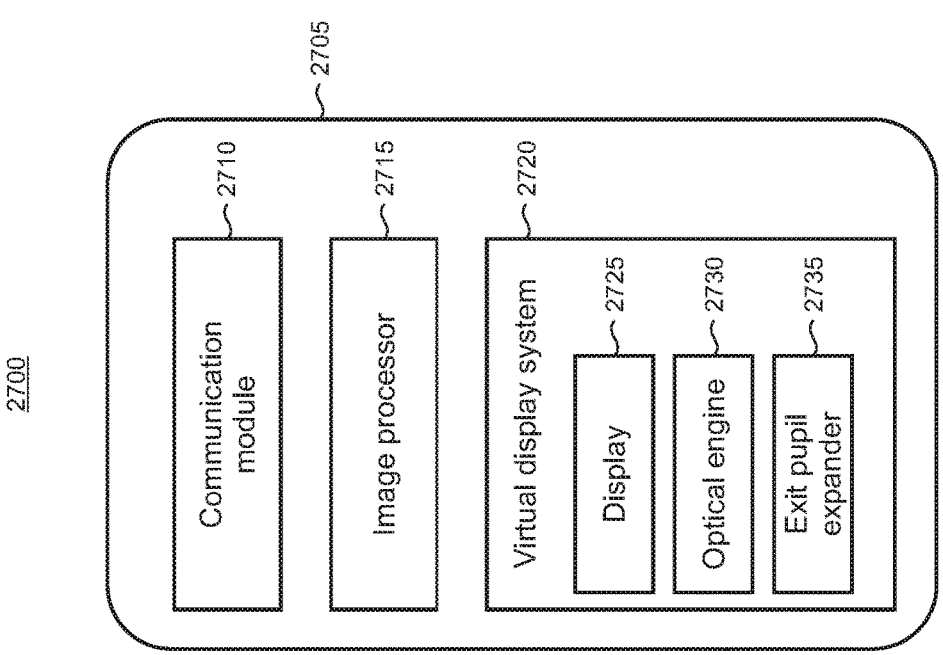
FIG. 27 shows a block diagram of an illustrative electronic device that incorporates an exit pupil expander.

As shown in FIG. 27, near-eye display systems with extended FOV using optically stitched imaging can be used in a mobile or portable electronic device 2700, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2700 includes a housing 2705 to house a communication module 2710 for receiving and transmitting information from and to an external device, or a remote system or service (not shown).

The portable device 2700 may also include an image processor 2715 using one or more processors for handling the received and transmitted information, and a virtual display system 2720 to support viewing of images. The virtual display system 2720 can include a micro-display or an imager 2725 and an optical engine 2730. The image processor 2715 may be operatively connected to the optical engine 2730 to provide image data, such as video data, to the imager 2725 to display an image thereon. An EPE 2735 can be optically linked to an optical engine 2730. The EPE may be configured for an extended FOV using optically stitched imaging.

Near-eye display systems with extended FOV using optically stitched imaging may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present extended field of view in near-eye display using optically stitched imaging are now presented by way of illustration and not as an exhaustive list of all embodiments. An example includes a near-eye display system configured to produce a field of view (FOV) to an eye of a user of the near-eye display system, comprising: a substrate of optical material configured as a waveguide; left and right in-coupling diffractive optical elements (DOEs) disposed on the substrate, the left in-coupling DOE having an input surface configured to receive one or more optical beams for a left portion of the FOV as an entrance pupil, the right in-coupling DOE having an input surface configured to receive one or more optical beams for a right portion of the FOV as an entrance pupil; left and right intermediate DOEs disposed on the substrate and configured to receive the optical beams for the left and right portions of the FOV respectively from the left and right in-coupling DOEs, the left intermediate DOE configured for pupil expansion of the one or more optical beams for the left portion of the FOV along a first direction, the right intermediate DOE configured for pupil expansion of the one or more optical beams for the right portion of the FOV along the first direction; an out-coupling DOE disposed on the substrate and configured to receive the optical beams for the left and right portions of the FOV respectively from the left and right intermediate DOEs, the out-coupling DOE having an output surface and configured for pupil expansion of the one or more optical beams for each of the left and right portions of the FOV along a second direction, and further configured to couple, as an output from the output surface, one or more optical beams for the FOV comprised of combined left and right portions, the output from the out-coupling DOE having expanded pupil relative to the entrance pupils at each of the left and right in-coupling DOEs.

In another example, the left and right intermediate DOEs at least partially overlap on the waveguide. In another example, overlapping portions of the left and right intermediate DOEs comprise doubly-periodic grating features. In another example, the near-eye display system further comprises left and right imagers that respectively provide the left and right portions of the FOV as entrance pupils to the left and right in-coupling DOEs. In another example, the left and right portions of the FOV partially overlap. In another example, the left and right intermediate DOEs are disposed on opposite sides of the substrate or the left and right in-coupling DOEs are disposed on opposite sides of the substrate.

A further example includes an electronic device, comprising: an image processor; an optical engine operatively connected to the image processor for receiving imaging data; a first imager operatively connected to the optical engine to form images based on the imaging data and to generate one or more input optical beams incorporating the images in a first partial field of view (FOV); a second imager operatively connected to the optical engine to form images based on the imaging data and to generate one or more input optical beams incorporating the images in a second partial FOV; and an exit pupil expander comprising a waveguide on which multiple diffractive optical elements (DOEs) are disposed, in which the exit pupil expander is configured to output one or more output optical beams that combine the first and second partial FOVs, using one or more of the DOEs, as a near-eye display with an expanded exit pupil.

In another example, the exit pupil expander provides pupil expansion in two directions. In another example, the first or second imager includes one of light emitting diode, liquid crystal on silicon device, organic light emitting diode array, or micro-electro mechanical system device. In another example, the exit pupil expander comprises five DOEs including left and right in-coupling DOEs, left and right intermediate DOEs, and a single out-coupling DOE wherein the left in-coupling DOE is configured to in-couple the first partial FOV from the first imager into the waveguide, the right in-coupling DOE is configured to in-couple the second partial FOV from the second imager into the waveguide, the left intermediate DOE is configured to expand the first partial FOV in a first direction, the right intermediate DOE is configured to expand the second partial FOV in a first direction, and the single out-coupling is configured to expand the first and second partial FOVs in the second direction. In another example, either the left or right in-coupling DOE is configured as a wide-band polarization grating or as a surface relief grating using an optical material having a higher refractive index relative to that utilized by either the left or right intermediate DOE. In another example, the left and right intermediate DOEs are each configured to support forward propagation of light in opposite directions. In another example, the left and right intermediate DOEs are disposed on the waveguide with at least partial overlap and wherein the partial overlap includes grating features having two different periods. In another example, the left and right intermediate DOEs includes grating features configured to impart polarization sensitivity and the light propagates in the left intermediate DOE with a polarization state that is opposite to that of light propagating in the right intermediate DOE.

A further example includes a method of operating a near-eye display system, comprising: receiving light forming an entrance pupil with a full field of view (FOV) at an in-coupling diffractive optical element (DOE) disposed in an exit pupil expander; steering a left portion of the FOV in a left intermediate DOE disposed in the exit pupil expander in which an exit pupil of the received light is expanded along a first coordinate axis and diffracted to an out-coupling DOE; steering a right portion of the FOV in a right intermediate DOE disposed in the exit pupil expander in which an exit pupil of the received light is expanded along the first coordinate axis and diffracted to the out-coupling DOE; expanding the exit pupil of the received light in the entrance pupil along a second coordinate axis in the out-coupling DOE disposed in the exit pupil expander; and outputting light with an expanded exit pupil relative to the received light at the in-coupling DOE along the first and second coordinate axes using the out-coupling DOE.

In another example, light propagates in opposite directions in the left and right intermediate DOEs or the light propagates with orthogonal states of polarization in the left and right intermediate DOEs. In another example, the in-coupling DOE is centrally disposed on the exit pupil expander and the left and right intermediate DOEs extend laterally from the in-coupling DOE on the exit pupil. In another example, the method further includes stitching the FOV portions together to provide the full FOV in the out-coupling DOE. In another example, each of the left and right intermediate DOEs selects a portion of the FOV for steering based on evanescent diffraction orders. In another example, the stitched FOV portions are in one of symmetric or asymmetric configuration in the full FOV.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye display system configured to produce a field of view (FOV) to an eye of a user of the near-eye display system, comprising:
   a substrate of optical material configured as a waveguide;
   left and right in-coupling diffractive optical elements (DOEs) disposed on the substrate, the left in-coupling DOE having an input surface configured to receive one or more optical beams for a left portion of the FOV as an entrance pupil, the right in-coupling DOE having an input surface configured to receive one or more optical beams for a right portion of the FOV as an entrance pupil;
   left and right intermediate DOEs disposed on the substrate and configured to receive the optical beams for the left and right portions of the FOV respectively from the left and right in-coupling DOEs, the left intermediate DOE configured for pupil expansion of the one or more optical beams for the left portion of the FOV along a first direction, the right intermediate DOE configured for pupil expansion of the one or more optical beams for the right portion of the FOV along the first direction;
   an out-coupling DOE disposed on the substrate and configured to receive the optical beams for the left and right portions of the FOV respectively from the left and right intermediate DOEs, the out-coupling DOE having an output surface and configured for pupil expansion of the one or more optical beams for each of the left and right portions of the FOV along a second direction, and further configured to couple, as an output from the output surface, one or more optical beams for the FOV comprised of combined left and right portions, the output from the out-coupling DOE having expanded pupil relative to the entrance pupils at each of the left and right in-coupling DOEs.

2. The near-eye display system of claim 1 in which the left and right intermediate DOEs at least partially overlap on the waveguide.

3. The near-eye display system of claim 2 in which overlapping portions of the left and right intermediate DOEs comprise doubly-periodic grating features.

4. The near-eye display system of claim 1 further comprising left and right imagers that respectively provide the left and right portions of the FOV as entrance pupils to the left and right in-coupling DOEs.

5. The near-eye display system of claim 1 in which the left and right portions of the FOV partially overlap.

6. The near-eye display system of claim 1 in which the left and right intermediate DOEs are disposed on opposite sides of the substrate or the left and right in-coupling DOEs are disposed on opposite sides of the substrate.

7. An electronic device, comprising:
an image processor;
an optical engine operatively connected to the image processor for receiving imaging data;
a first imager operatively connected to the optical engine to form images based on the imaging data and to generate one or more input optical beams incorporating the images in a first partial field of view (FOV);
a second imager operatively connected to the optical engine to form images based on the imaging data and to generate one or more input optical beams incorporating the images in a second partial FOV; and
an exit pupil expander configured to receive the one or more input optical beams from the first and second imager as an entrance pupil, and comprising a waveguide on which multiple diffractive optical elements (DOEs) are disposed, in which the exit pupil expander is configured to output one or more output optical beams that combine the first and second partial FOVs, using one or more of the DOEs, as a near-eye display with an exit pupil that is expanded relative to the entrance pupil.

8. The electronic device of claim 7 in which the exit pupil expander provides exit pupil expansion relative to the entrance pupil in two directions.

9. The electronic device of claim 7 in which the first or second imager includes one of light emitting diode, liquid crystal on silicon device, organic light emitting diode array, or micro-electro mechanical system device.

10. The electronic device of claim 7 in which the exit pupil expander comprises five DOEs including left and right in-coupling DOEs, left and right intermediate DOEs, and a single out-coupling DOE wherein the left in-coupling DOE is configured to in-couple the first partial FOV from the first imager into the waveguide, the right in-coupling DOE is configured to in-couple the second partial FOV from the second imager into the waveguide, the left intermediate DOE is configured to expand the first partial FOV in a first direction, the right intermediate DOE is configured to expand the second partial FOV in a first direction, and the single out-coupling DOE is configured to expand the first and second partial FOVs in a second direction.

11. The electronic device of claim 10 in which either the left or right in-coupling DOE is configured as a wide-band polarization grating or as a surface relief grating using an optical material having a higher refractive index relative to that utilized by either the left or right intermediate DOE.

12. The electronic device of claim 10 in which the left and right intermediate DOEs are each configured to support forward propagation of light in opposite directions.

13. The electronic device of claim 10 in which the left and right intermediate DOEs are disposed on the waveguide with at least partial overlap and wherein the partial overlap includes grating features having two different periods.

14. The electronic device of claim 10 in which the left and right intermediate DOEs includes grating features configured to impart polarization sensitivity and the light propagates in the left intermediate DOE with a polarization state that is opposite to that of light propagating in the right intermediate DOE.

15. A method of operating a near-eye display system, comprising:
receiving light forming an entrance pupil with a full field of view (FOV) at an in-coupling diffractive optical element (DOE) disposed in an exit pupil expander;
steering a left portion of the FOV in a left intermediate DOE disposed in the exit pupil expander in which an exit pupil of the received light is expanded along a first coordinate axis and diffracted to an out-coupling DOE;
steering a right portion of the FOV in a right intermediate DOE disposed in the exit pupil expander in which an exit pupil of the received light is expanded along the first coordinate axis and diffracted to the out-coupling DOE;
expanding the exit pupil of the received light in the entrance pupil along a second coordinate axis in the out-coupling DOE disposed in the exit pupil expander; and
outputting light with an expanded exit pupil relative to the received light at the in-coupling DOE along the first and second coordinate axes using the out-coupling DOE.

16. The method of claim 15 in which light propagates in opposite directions in the left and right intermediate DOEs or the light propagates with orthogonal states of polarization in the left and right intermediate DOEs.

17. The method of claim 16 further including stitching the FOV portions together to provide the full FOV in the out-coupling DOE.

18. The method of claim 17 in which each of the left and right intermediate DOEs selects a portion of the FOV for steering based on evanescent diffraction orders.

19. The method of claim 18 further in which the stitched FOV portions are in one of symmetric or asymmetric configuration in the full FOV.

20. The method of claim 15 in which the in-coupling DOE is centrally disposed on the exit pupil expander and the left and right intermediate DOEs extend laterally from the in-coupling DOE on the exit pupil.

* * * * *